United States Patent [19]

Chakraborty

[11] Patent Number: 5,130,079
[45] Date of Patent: Jul. 14, 1992

[54] DEVICE FOR REMOVAL OF HYDROGEN FROM A MIXTURE OF GASES CONTAINING HYDROGEN, OXYGEN, STEAM, AND AEROSOLS

[75] Inventor: Amiya K. Chakraborty, Erfstadt, Fed. Rep. of Germany

[73] Assignee: Gesellschaft Fur Reaktorsicherheit (GRS) mbH, Cologne, Fed. Rep. of Germany

[21] Appl. No.: 639,039

[22] Filed: Jan. 8, 1991

[30] Foreign Application Priority Data

Jan. 8, 1990 [DE] Fed. Rep. of Germany ....... 4000342
Jan. 8, 1990 [DE] Fed. Rep. of Germany ....... 4003833

[51] Int. Cl.$^5$ .............................................. G21C 9/00
[52] U.S. Cl. ..................... 376/301; 376/300; 55/310
[58] Field of Search ............... 376/301, 300, 314, 309, 376/310; 423/651, 652; 502/53; 55/310; 422/222

[56] References Cited

U.S. PATENT DOCUMENTS

| 2,847,284 | 8/1958 | Busey ................... 376/301 |
| 3,217,471 | 11/1965 | Silverman ............... 376/314 |
| 3,857,927 | 12/1974 | Henrie .................. 423/580 |
| 3,961,920 | 6/1976 | Gilbert ................. 376/314 |
| 3,975,170 | 8/1976 | Keating, Jr. ............ 55/16 |
| 4,228,132 | 10/1980 | Weems et al. ........... 422/174 |
| 4,430,293 | 2/1984 | Callaghan et al. ....... 376/314 |
| 4,992,407 | 2/1991 | Chakroborty et al. ..... 502/327 |

FOREIGN PATENT DOCUMENTS

| 0303144 | 2/1989 | European Pat. Off. |
| 3604416 | 8/1987 | Fed. Rep. of Germany |
| 3725290 | 2/1989 | Fed. Rep. of Germany |

OTHER PUBLICATIONS

Development of a Sponge Metal Catalyst for a Recombiner Hiroyoki Tsuchiya, Nuclear Technology, vol. 58 Sep. 1982.

Primary Examiner—Brooks H. Hunt
Assistant Examiner—Meena Chelliah
Attorney, Agent, or Firm—Lahive & Cockfield

[57] ABSTRACT

An apparatus for removing hydrogen from a mixture of gases containing hydrogen, oxygen, steam, and aerosols, with a catalyst arrangement composed of a substrate coated with a material which catalyzes the oxidation of hydrogen while releasing heat. The apparatus is characterized by a protective device which encloses a catalyst arrangement until a preset temperature is reached. Once the preset temperature is reached, the apparatus is automatically movable into a position which exposes the catalyst arrangement, with the protective device being permeable to gas pressure but essentially impermeable to aerosols. Consequently, the catalyst arrangement is protected against deposition of aerosols contained in the gas mixture until the preset temperature is reached.

15 Claims, 5 Drawing Sheets

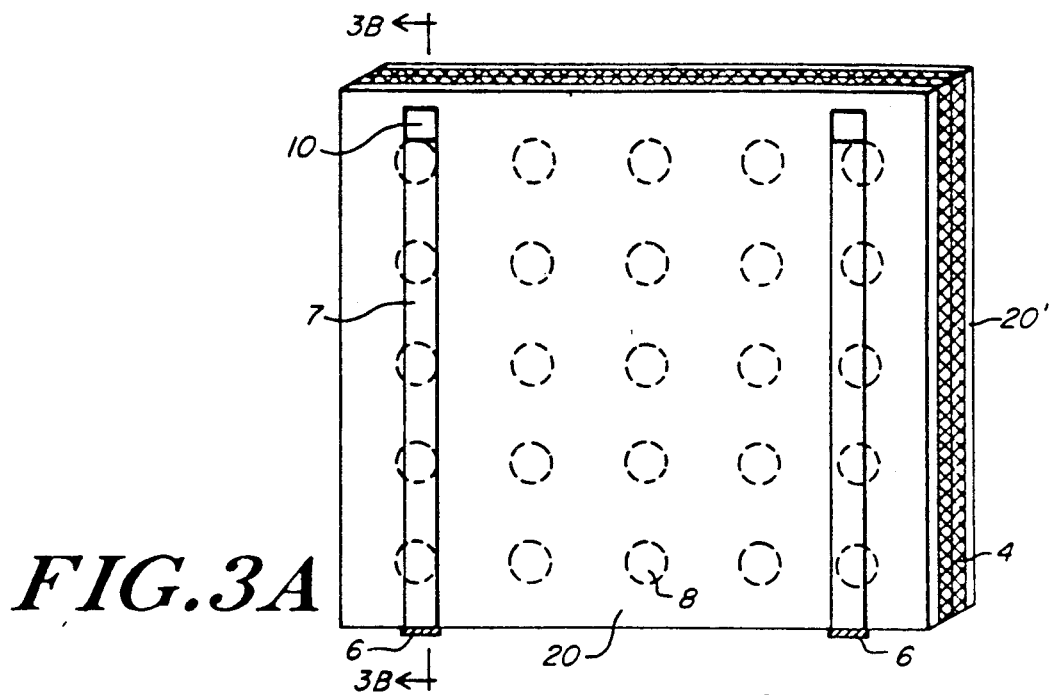
*FIG.3A*
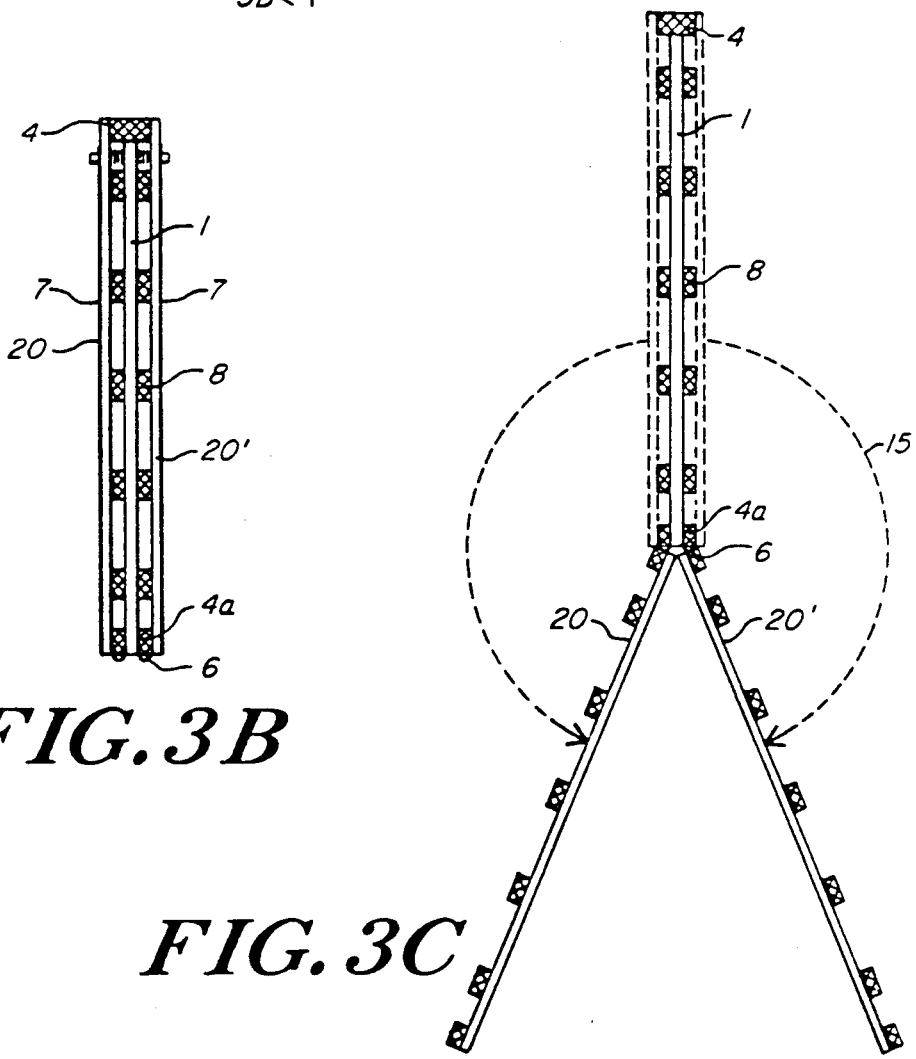
*FIG.3B*
*FIG.3C*

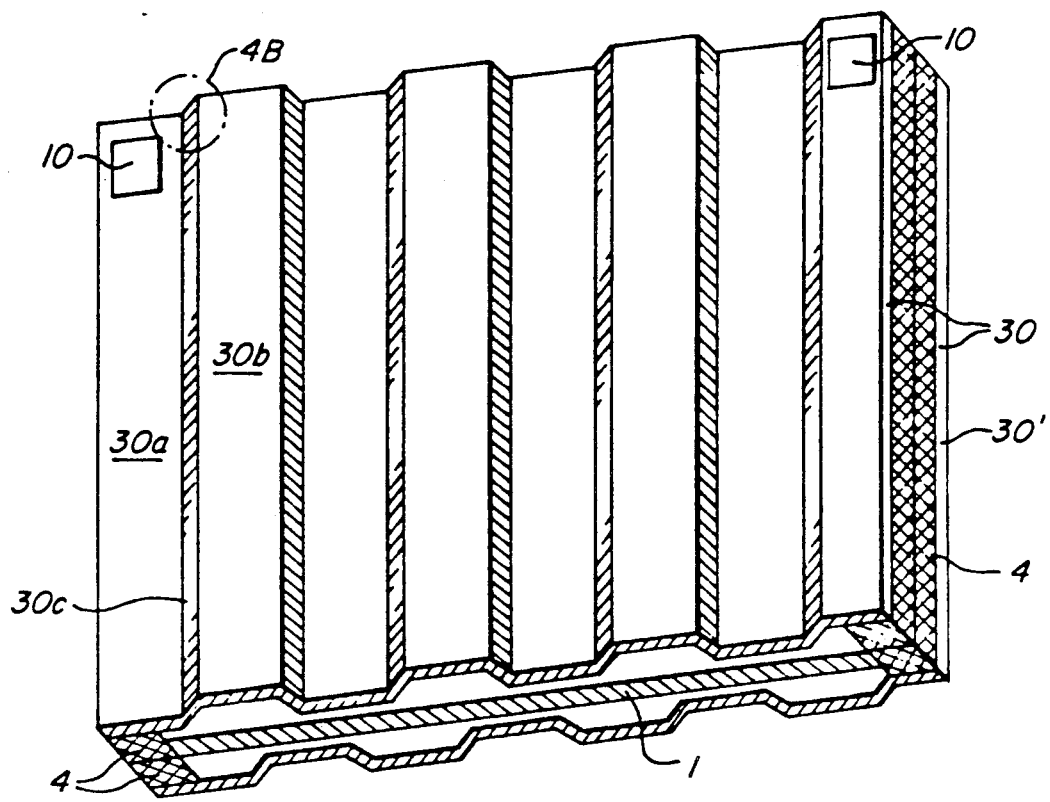
FIG. 4A
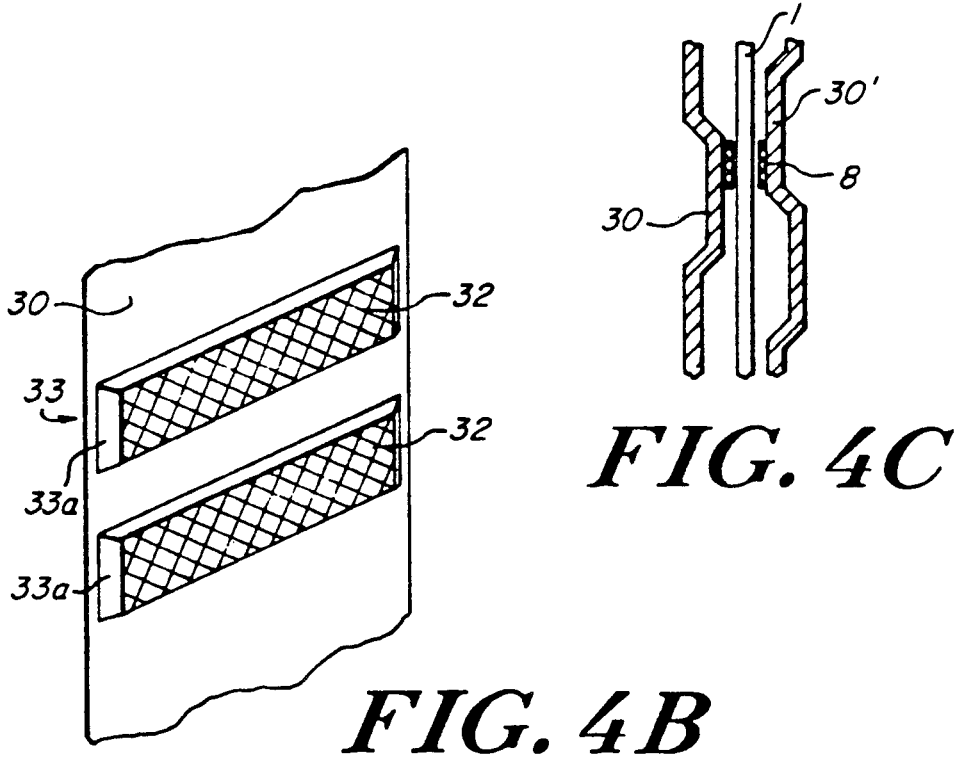
FIG. 4C
FIG. 4B

DEVICE FOR REMOVAL OF HYDROGEN FROM A MIXTURE OF GASES CONTAINING HYDROGEN, OXYGEN, STEAM, AND AEROSOLS

BACKGROUND

This invention relates to the removal of hydrogen from gases by using a catalyst. More particularly, the invention relates to a device and a process for removing hydrogen from gases containing hydrogen with a catalyst arrangement composed of a substrate which is coated with a material that catalyzes the oxidation of hydrogen while releasing heat. The invention can be used for removing hydrogen from gases and mixtures of gases containing, in addition to hydrogen, oxygen, steam and aerosols.

For example, the hydrogen can escape into the atmosphere of the safety vessel, which contains oxygen, or into the atmosphere of a pressure suppression system of a nuclear reactor. To eliminate the escaping hydrogen, the prior art device uses metals which have a high degree of hydrogen absorbency, even at low hydrogen partial pressures in gas mixtures.

To prevent oxidation, the metals are coated with a hydrogen-permeable protective layer. This coating makes it possible to use a material for the protective layer which acts as a catalyst to oxidize the hydrogen with whatever oxygen is present, to form water.

The hydrogen-absorbent metal can be either self-supporting or be a layer on a substrate. For use as a safety device that is required only in the event of an accident, provision is made in the prior art device for the substrate bearing the catalyzing protective layer to be mounted inside a closed container that opens only in the event of an accident. Typically the container opens in response to pressure. In one embodiment of the prior art device, the container has a rupture disk at its upper and lower ends which breaks in the event of an accident. Inside the container is a package of the coated metal(s) that absorb hydrogen. The surrounding gas mixture flows into the container after the rupture disks are broken, creating a convective gas flow in the container from its bottom to its top.

In another embodiment of the prior art device, a film made of the coated hydrogen-absorbent metal is stored rolled up in a container. The container is hung from a ceiling and opens in the event of an accident so that the rolled-up film can unroll and produce a large surface area for contact with the gas mixture.

A similar device is known from German Patent Application No. DE-A 37 25 290. That publication teaches a material that is especially well suited as a catalyst and with which a lattice-type or sheet-type substrate is coated on one or both sides. The coated substrate is stored folded or rolled up in a gas-tight housing that opens only in the event of an accident so that the substrate can then unfold or unroll. The substrate and the catalyst materials disclosed in that document are well suited for use within the scope of the present invention.

During a core meltdown in a nuclear reactor pressure vessel (RPV), a temperature rise of up to 2400° C. can occur, with large quantities of fission products and of structural materials being released into the atmosphere of the containment vessel. The result is a mixture of steam and gases in which aerosol particles can be suspended, typically with a weight concentration of up to twenty g/m$^3$. The term "aerosol" is used herein in a broad sense to mean a suspension of liquid or solid particles in a gas. Thus, for example, in the low-pressure path at the beginning of the interaction between the melt and the concrete, one to three tons of dispersed material can be suspended in the air in the containment vessel. By far the largest percentage by weight, commonly more than 95%, is nonradioactive. However, most of the radioactive substances are bonded to aerosol particles. The release of hydrogen during reactor accidents, mentioned at the outset, coincides in time with this release of aerosols.

Prototype tests have shown that, commonly, the release of steam occurs practically simultaneously with the beginning of a core meltdown accident, while the release of hydrogen and, simultaneously therewith, the release of aerosols, take place only after a certain delay. When large quantities of steam are present and the flow is strong, the catalytic reaction to remove hydrogen proceeds more slowly. The reaction rate increases exponentially with temperature. It is only after a sufficiently high temperature is reached at the surface of the catalyst that sufficient convective flow develops to prevent the aerosol particles contained in the gas mixture from being deposited on the surface of the catalyst. This prevention is reinforced by the constant generation of steam at the surface of the catalyst, which occurs at correspondingly high temperature and conversion rates. However, as long as the temperature of the catalyst in the initial phase is not yet sufficiently high, aerosol particles and grease particles contained in the steam can settle on the catalyst surface, reducing the effective catalyst surface and thereby considerably reducing the action of the catalyst.

Thus, it is an object of this invention to provide a device of the type recited above and in which the deposition on the surface of a catalyst of aerosol particles and of grease particles contained in the steam is largely prevented, and the temperature required to achieve a high reaction rate is reached quickly.

The invention as described and claimed below achieves this and further objects that will become apparent from the following description.

SUMMARY

A hydrogen-removing protective device according to this invention retards free access of aerosols to the surface of a catalyst during an initial phase of a catalyst reaction. The protective device forms a space which receives the catalyst and which is in gas communication with the atmosphere surrounding the protective device in such a manner that sufficient hydrogen and oxygen are available inside the protective device to react, but no flow that is too strong, and that hence leads to a correspondingly large heat loss, develops. In addition, aerosol particles are largely prevented from entering the space inside the protective device. In this manner, the protective device of the invention enables a sufficient high temperature, e.g. about 100° C., to be reached in a relatively short time, at which point a so-called self-sustaining accelerated catalytic reaction occurs. According to a further feature of the invention, the protective device then automatically opens, so that the catalyst is fully exposed to the gas mixture from which hydrogen is to be removed.

Preferred illustrative embodiments of the invention are described in detail below with reference to the schematic diagrams.

BRIEF DESCRIPTION OF THE DRAWINGS

FIG. 3A shows a perspective view of another embodiment of the invention in its closed state;

FIG. 3B shows a cross-section view of the embodiment of FIG. 3A taken along line C—C in FIG. 3A;

FIG. 3C shows an end elevation view of the embodiment of FIG. 3A in the unfolded state;

FIG. 4A shows a perspective view of another embodiment of the invention in its closed state;

FIG. 4B shows a partially cutaway view of the embodiment of FIG. 4A;

FIG. 4C shows, an enlarged, cross-section view of a portion of a cover panel of FIG. 4A.

DESCRIPTION OF THE ILLUSTRATED EMBODIMENTS

Figure 1A:
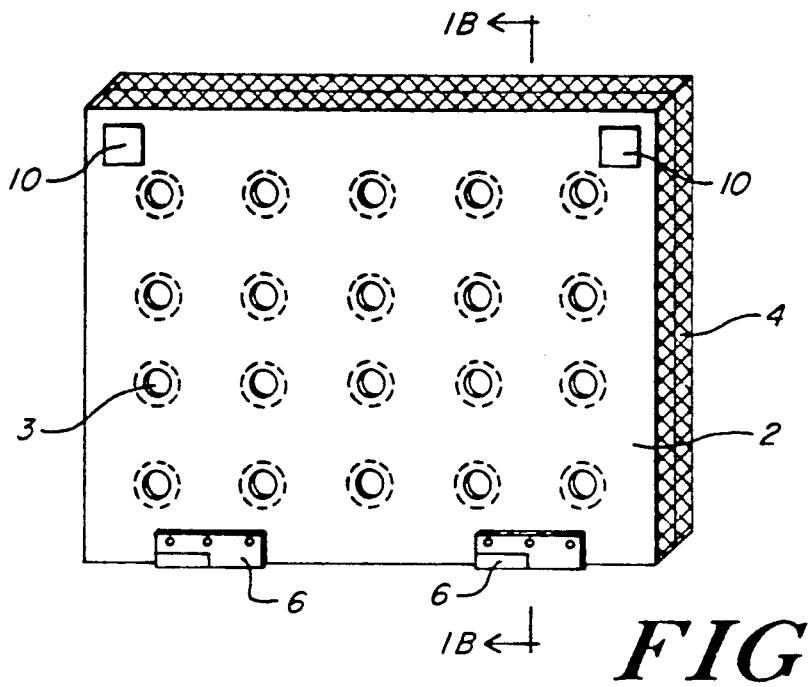
FIG. 1A shows a front perspective view of an embodiment of the invention in a closed state before reaching a preset temperature.
Figures 1B, 1C:
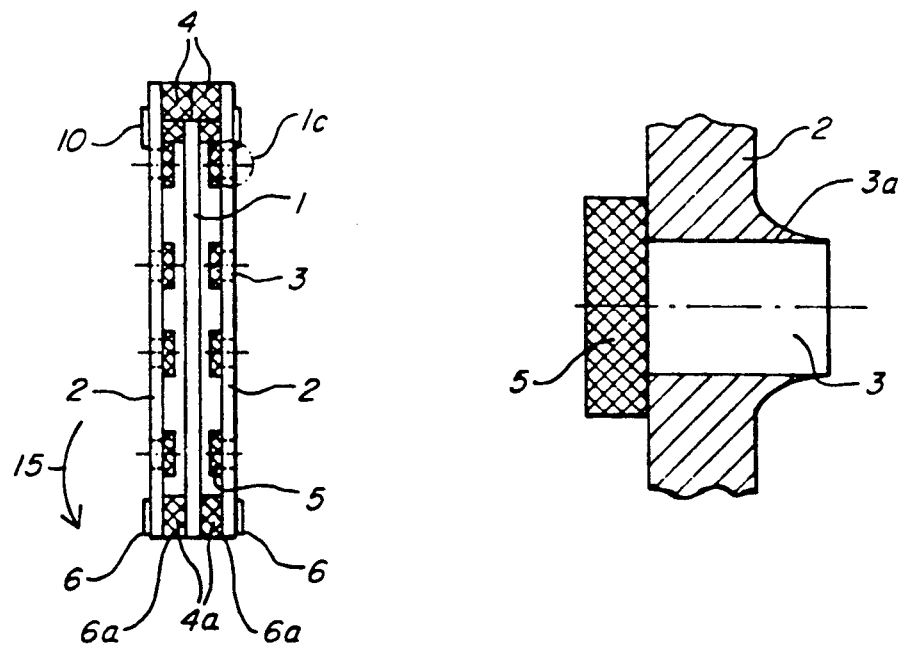
FIG. 1B shows a cross-section view of the embodiment of FIG. 1A along line A—A.
FIG. 1C shows an enlarged fragmentary detail view of a portion of FIG. 1B to clarify the structure of the holes.
Figure 2A:
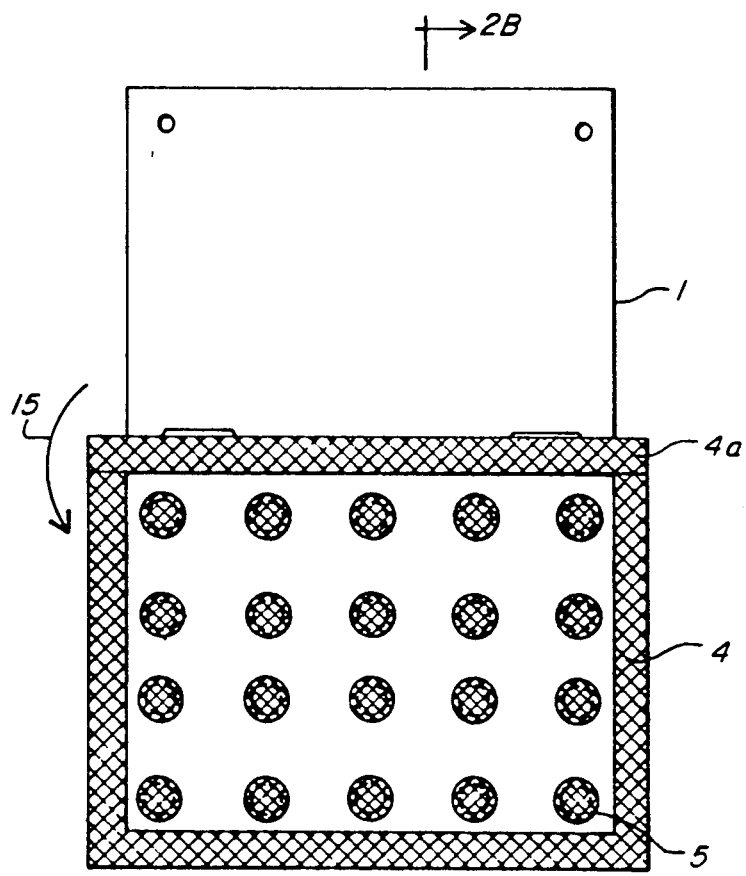
FIG. 2A shows a side elevation view of the embodiment of FIG. 1A in its unfolded state.
Figure 2B:
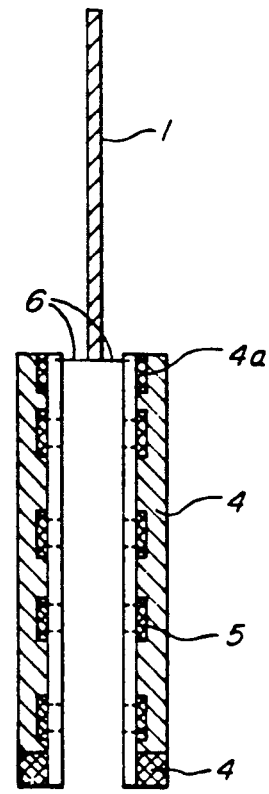
FIG. 2B shows a cross-section view of FIG. 2A, taken along line B—B in FIG. 2A.
Figure 5:
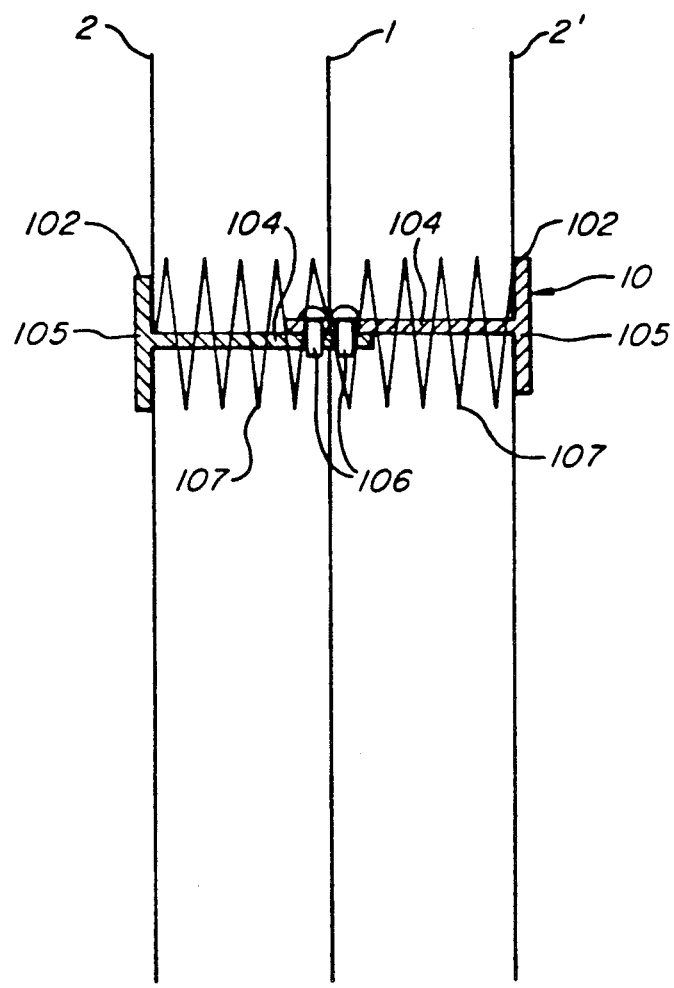
FIG. 5 shows an enlarged, schematic representation of a holding device embodying further features of the present invention.

FIGS. 1A through 4C show a first embodiment of the invention in which two cover panels 2, 2' are articulated by hinges 6 to the underside of a catalyst panel 1 in such fashion that they can be unfolded from the closed position shown in FIGS. 1A-1B, 3A-3B and 4A into the open position shown in FIGS. 2A-2B and 3C. In the initial state, the device is closed, with the two cover panels 2 and 2' held in the closed position by holding device 10 that releases when a preset internal temperature is reached. As soon as the preset temperature is reached, the holding devices 10 release, and pretensioning elements, an example of which is disclosed with reference to FIG. 5, ensure that cover panels 2 and 2' unfold in the direction of arrow 15 (FIGS. 1B and 2A) to the open position.

In the closed position, the two cover panels 2, 2' are located on both sides parallel to catalyst panel 1. The distance between the catalyst panel 1 on the one hand and the two cover panels 2, 2' on the other is determined by the length of legs 6a of hinges 6, and by edge filters 4, 4a. The illustrated edge filters 4, 4A, as shown, are secured to the perimeter of each cover panel 2, 2' on the surface thereof that faces the catalyst panel 1 in the closed position, FIG. 1B. In the embodiment shown (see FIGS. 1B and 2A), the dimensions of catalyst panel 1 are slightly smaller (e.g., 1 to 2 cm) than those of the two cover panels 2, 2', so that the upper edge and the two side edges (relative to the figure) of catalyst panel 1 seat within the edge filters 4a, which are located between cover panels 2, 2'. Further, the filter 4 on the upper and two side edges of the cover panels abut the catalyst panel 1 in the closed position.

In the area of the underside of catalyst panel 1, where hinges 6 are mounted, edge filters 4a are each provided between a cover panel 2 or 2' and the catalyst panel 1, and have a thickness less than that of each edge filter 4 by half the thickness of catalyst panel 1. Cover panels 2 and 2' preferably have a thickness in the range from 0.1 to 1 mm and can be made of aluminum, copper, their alloys, or preferably from an austenitic steel, having the advantage that it does not oxidize.

Cover panels 2, 2' include punched holes 3, which are provided have a bead-shaped punched burr 3a on the respective outer sides of the cover panels 2, 2', as shown in FIG. 1C. The holes can be circular holes, elongated holes, or slots. On the inside of cover panels 2, 2' these holes 3 are covered by respective filter disks 5 which, like the edge filters 4 and 4a, are mounted in a heat-resistant manner on the respective cover panels 2, 2'. The space between the two cover panels 2, 2' is connected for fluid communication to the outside environment by holes 3, that are associated with the filter discs 5, and at the circumferential edges by the filters 4, 4a.

Edge filters 4, 4a and filter disks 5 are made of the same nonflammable filter material. So-called HEPA (High Efficiency Particulate Air) filters are especially suitable for this purpose. These filters are characterized by an especially high separating ability for aerosols, and also possess high permeability to the gases which are to react with one another with the support of the catalyst panel. However, since these filter materials have relatively low repulsion toward water and steam, they are preferably combined with prefilters which combine high gas permeability to the reacting gases with good repulsion toward steam. These prefilters, for which the filters commercially sold under the name ULPA, for example, are especially suitable, must each be facing outside the apparatus. Thus, each edge filter 4, 4A and each filter disk 5 preferably is a laminate of an outer prefilter and an inner particulate filter. In the gas flow direction, a thickness of approximately 0.5 mm is required for each of these two types of filters, so that the total thickness of the combined filters is about 1 mm. Since the water vapor contained in the gas mixture can be highly ionized and therefore very aggressive, it is advantageous to impregnate the filter material with an ion exchanger so as to reduce the aggressiveness of the steam. The filters are then mounted to the apparatus of the invention in a dry state.

Upon exposure to a nuclear incident, in the closed position of the device shown in FIGS. 1A and 1B, the gas mixture composed of hydrogen, air, and steam residue penetrates through holes 3 and filter disks 5 as well as edge filters 4 and 4a into the volume of space in which the catalyst panel 1 is mounted between cover panels 2 and 2', so that a reaction occurs on the surface of the catalyst panel 1. To increase the surface area of the catalyst structure, the insides of cover panels 2, 2' can also be coated with the catalyst material. Condensate which forms on the outside of cover panels 2, 2' is guided by the bead-shaped stamped or punched burrs 3a around holes 3, and therefore does not enter the space between cover panels 2, 2'. The burrs may generally be in the form of projecting deflecting means which substantially encircle each hole 3 for deflecting condensate liquid from entering the hole 3. Aerosols contained in the ambient atmosphere then settle on the outside of the cover panels or are prevented by the filtering action of filters 4, 4a, and 5 from entering the space between the cover panels.

Thus, when the device is in the closed state, sufficient catalyst surface is available for the gases to be brought into reaction with one another, even when the aerosol density outside the device is high. This catalytic reaction heats the gas mixture, so that a convective flow develops This convection flow results in a cooler gas mixture being drawn through the lower holes into the interior of the device and coming into contact with the catalyst surface. The already heated and reacted gas mixture escapes to the outside, through the holes higher up. The cover panels 2, 2' prevent the catalyst from giving off large amounts of heat to the outside steam. This results in a rapid temperature rise inside the device in combination with a steadily increasing rate of catalysis. Because of the rapid temperature rise, the steam which is located or formed in the space between cover panels 2 and 2' quickly reaches a superheated state in which it is less reactive and has no influence on the catalyzing action of the catalyst material. Because of the accelerated reaction, in combination with the temperature rise of the catalyst panel, more and more hydrogen in the penetrating gas mixture is oxidized.

When, upon reaching a preset internal temperature, a sufficiently high convective flow is attained along the catalyst surface so that substantially no more aerosol particles can settle on the catalyst surfaces, holding devices 10 open. This action changes the device from the closed position shown in FIGS. 1A and 1B to the open position shown in FIGS. 2A and 2B.

Holding devices 10 can be designed as shown schematically in FIG. 5. Each illustrated holding device comprises two T-shaped pieces 102 which are inserted by their long legs 104 from outside through a cover panels 2, 2' and catalyst panel 1, so that the crossbar 105 of each T piece abuts the outer surface of one respective cover panel 2, 2' on both sides of catalyst panel 1. The long legs 104 of two end-to-end T pieces overlap one another and are connected together by bolts or rivets 106. The bolts or rivets 106 are made of a material that melts when a preset temperature is reached. Suitable holes (not shown) are provided for this purpose in the long legs 104, and the cover panels 2, 2' and the catalyst panel 1 must also have holes through which the T pieces are inserted.

On the long leg 104 of each T piece 102 is a tensioned compression spring 107 which abuts the catalyst panel 1 at one end and the inner surface of the corresponding cover panel on the other. As soon as rivets 106 melt, thereby releasing the T pieces 102, the compression springs 107 push the two cover panels 2, 2' away from the catalyst panel 1, so that the apparatus assumes the position shown in FIGS. 2A and 2B. It should be emphasized that the holding device 10 described herein is intended only as an example of other releasable holding structures.

When cover panels 2, 2' have unfolded into the position shown in FIGS. 2A and 2B, after holding devices 10 have released, the catalyst surfaces, in other words especially the surface of catalyst panel 1 and optionally the catalyzed inner surfaces of cover panels 2, 2', are fully exposed to the gas mixture of the ambient-atmosphere so that they can then perform their catalyzing function without further limitation of the flow.

FIGS. 3A, 3B, and 3C show a second embodiment of the invention. FIGS. 3A and 3B show the closed state, and FIG. 3C shows the open state of the embodiment.

As in the first embodiment, the second also comprises as a basic component a catalyst panel 1, and has two hinge-mounted cover panels 20, 20'. Instead of the metallic cover panels 2, 2' of the first embodiment, the two cover panels 20, 20' of the second embodiment are made of filter material. As in the filters 4, 4a of the first embodiment, each of cover panels 20, 20' preferably has two filter layers, with an outer steam filter and an inner aerosol filter. In the preferred embodiment, the thickness of filtering cover panels 20, 20' is about 1 mm. Instead of the filter materials mentioned above, cover panels 20, 20' can be made of nonflammable Teflon (polytetrafluoroethylene) panels which exhibit a similar filtering action.

FIGS. 3A and 3B show that the illustrated cover panels 20, 20' are fastened in a heat-resistant manner to metal bands 7, which are made of copper or brass, for example. The metal bands 7 are articulated by means of hinges 6 to the underside (relative to the drawing) of catalyst panel 1. Near their upper ends, metal bands 7 are held together by holding devices 10. These holding devices can be made essentially in the same manner as the corresponding holding devices 10 in the first embodiment, described above, and release when a preset temperature is reached to enable cover panels 20, 20' to unfold from the closed position of FIGS. 3A and 3B to the open position of FIG. 3C.

In the second illustrated embodiment, edge filters 4, 4a are provided in the same manner as in the first embodiment. However, since in this embodiment the cover panels 20, 20' are themselves made of filter material, in the second embodiment the holes 3 of the first embodiment are absent. Spacers 8 are mounted in a heat-resistant manner on cover panels 20 and 20', to maintain a preset distance between cover panels 20, 20' and catalyst panel 1 in the closed position of the device. Spacers 8 have essentially the same thickness as the edge filters 4a. The use of such spacers 8 is advantageous because the thin cover panels 20 and 20' made of filter material do not exhibit high stiffness. Accordingly, the spacers 8 insure that the required space between the cover panels 20, 20' in the closed position is maintained. These spacers 8 preferably consist of filter material in order to be gas-permeable and to offer as little resistance as possible to any convective flow along the catalyst panel 1.

The operation of the second embodiment essentially corresponds to that of the first. Components of the gas mixture contained in the external environment pass through edge filters 4, 4a, through the entire surfaces of cover panels 20, 20' and into the space between the cover panels 20, 20' and catalyst panel 1 when the device is in the closed state. Aerosols that could settle out onto the catalyst surfaces in an initial phase of an accident, as well as water and steam, are essentially kept away from the atmosphere inside the cover panels because of the filtering action of cover panels 20, 20'. As in the first embodiment, a catalytic reaction takes place within the space enclosed by the cover panels 20, 20', in conjunction with heating and the eventually opening of the holding devices 10 and hence of the metal bands 7. Then the cover panels 20, 20', which have now fulfilled their purpose, fold downward as shown in FIG. 3C, so that the catalyst panel 1 is fully exposed to the gas mixture to be treated and can perform fully its catalytic function.

FIGS. 4A, 4B, and 4C show a third embodiment of the invention. In this third embodiment, metal cover panels 30, 30' are made of aluminum, copper, or their alloys, and preferably of an austenitic steel. In contrast to the first embodiment, the cover panels 30, 30' are corrugated. FIG. 4A shows only the upper part of the device. The articulation of cover panels 30, 30' provided by the structure of the lower part of the device, corresponds to that of the first embodiment (FIG. 1A) and is not shown.

As is apparent from FIG. 4A, the corrugated structure of each cover panel 30, 30' has an alternate succession of raised 30b and lowered 30a parallel, planar panel portions, in the form of a predetermined wave period. The panel portions extend vertically and are joined by step portions 30c. The step portions 30c, which extend vertically and further which link the peaks and valleys of the corrugations are, as shown in the detail of FIG. 4B, apertured with punched slots 33. These slots provide the function of the holes 3 in the first embodiment (FIGS. 1A-2B). The slots 33 are arranged essentially parallel to one another in a row along the respective step. As shown in FIG. 4B, the slots 33 are punched so that each is surrounded on the outside of cover panel 30 by a punched burr 33a whose function corresponds to that of the corresponding burr 3a (FIG. 1C) in the first embodiment.

During a nuclear reactor accident, when a gas mixture flows in the direction of the corrugations of cover panels 30, 30', i.e., perpendicular to the slots 33, this embodiment of the cover panels 30, 30' allows considerably more of the gas mixture to enter the device for catalytic reaction. In addition, the corrugated shape of cover panels 30, 30' produces a higher volume of gas mixture inside the cover panels, so long as the device is in the closed state.

Inside, the slots 33 are covered by filter strips 32, in the same manner as filter discs 5 cover holes 3 in the first embodiment (FIGS. 1B and 1C). Only edge filters 4, 4A and filter strips 32 allow the gas mixture to enter the interior of the apparatus for reaction with the catalyst surface while the device is closed.

As in the first embodiment, cover panels 30, 30' of the illustrated embodiment of FIGS. 4A–4C can be coated on their insides with catalyst material. When the corrugations of the two cover panels 30, 30' are offset with respect to one another, they can fit into one another when the device is in the open position, so that the open device is more compact.

If necessary, spacers 8, as shown in FIG. 4C, can be disposed between each of cover panels 30, 30' and catalyst panel 1. These spacers 8 are preferably made of gas permeable filter material offering as low resistance to convective flow as possible along the catalyst panel 1.

Also in the illustrated embodiment of FIG. 4A, as in other embodiments, the device is held in the closed state by holding devices 10, which open when a preset internal temperature is reached and which cause cover panels 30, 30' to unfold to a configuration similar to that shown in FIG. 2B.

Depending on the sequence of the nuclear reactor accident, the release of steam and hydrogen into a containment space can occur in the form of bursts. Several hours may elapse between two successive releases, during which time the catalyst panels of the opened devices can cool off, requiring a long time before they reach the necessary internal temperature. It is therefore advantageous to dispose a plurality of apparatus of the invention inside a space to be protected, each apparatus preset to open at different temperatures by way of correspondingly different designs of their holding devices 10. For example, three separate devices could be provided with response temperatures of 117° C., 145° C., and 180° C., respectively. The device with the lowest response temperature will open at the first release of steam and hydrogen, and fulfill its purpose. Assuming that subsequent releases of steam are larger in volume and result in higher temperatures, the other devices then open correspondingly in stages and remain functional until the respective response temperatures are reached.

The protective devices according to the present invention protect the catalyst arrangement contained within against deposits, until a so-called sustaining accelerated catalytic reaction occurs. After reaching a preset internal temperature, the catalyst arrangement presents a large catalyst surface for the rest of the reaction to occur. As long as the apparatus is in its closed state, even with a high flow outside the apparatus, only a small loss of the heat is created by the catalytic reaction, so that the temperature of the catalyst arrangement rapidly rises. Due to the limitation on the admission of the gas mixture to the catalyst surface caused by the density of the filter material, its thickness, and/or the number and size of the holes, the device also protects against excessive heat loss to steam contained in the atmosphere. The protective device also protects the catalyst arrangement against contamination by oil, grease, sulfur, and other forms of contamination contained in the air, and thus retains its functional capability over a long period of time.

The embodiments described above each include a catalyst panel 1, having surfaces coated with a catalyst material. Each embodiment also includes filter material which may be impregnated with an ion exchange resin. In another embodiment the catalyst panel 1 can be made of two layers of netting between which the catalyst material, e.g., in the form of a granulate or porous as in an open-celled sponge, is enclosed. In this manner, a very large catalyst surface can be provided with a panel-shaped arrangement which does not differ significantly in shape from a surface-coated catalyst panel. The netting in such a catalyst panel is preferably made of stainless steel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which came within the meaning and range of equivalency of the claims are therefore intended to be embraced therein.

What is claimed is:

1. In apparatus for removing hydrogen from an atmosphere having a mixture of gases, said apparatus including a catalyst arrangement composed of a substrate which is coated with a material that catalyzes the oxidation of hydrogen while releasing heat, the improvement comprising
   a protective enclosure-forming device having hinging means and being associated with said catalyst arrangement, said protective device being gas-permeable and essentially impermeable to aerosols,
   said protective device having a first, closed position wherein said device encloses said catalyst arrangement, and a second, open position for introducing said catalyst arrangement into said atmosphere when said protective device attains a predetermined temperature, and
   said hinging means being arranged for selectively moving said protective device from said first, closed position, to said second, open position to expose said catalyst arrangement to said atmosphere.

2. In apparatus according to claim 1, the further improvement
wherein said catalyst arrangement includes a catalyst panel,
wherein said protective device includes at least two cover panels exhibiting fluid filtration properties, and
wherein said hinge means articulates said cover panels at or about one side edge of said catalyst panel for movement between a first position, in which said cover panels enclose said catalyst panel, and a second position in which said cover panels are folded away from said catalyst panel.

3. In apparatus according to claim 2, the further improvement wherein said catalyst panel comprises a catalyst granulate.

4. In apparatus according to claim 2, the further improvement wherein said catalyst panel comprises an open-celled porous sponge.

5. In apparatus according to claim 2, the further improvement
wherein each said cover panel comprises a gas-permeable filter impermeable to at least one fluid from the group consisting of aerosols, grease, and steam.

6. In apparatus according to claim 2, the further improvement
wherein each said cover panel includes an inner layer and an outer layer, and wherein said inner layer defines a plurality of holes which are open to said catalyst panel in said first, closed position, and
further comprising filter elements of a gas-permeable filter material which cover each of said holes, said filter elements being essentially impermeable to at least one of aerosols and steam.

7. In apparatus according to claim 6, the further improvement wherein projecting deflecting means substantially encircle each said hole for deflecting liquid from entering said hole.

8. In apparatus according to claim 2, the further improvement wherein each said cover panel includes corrugations of a predetermined wave period such that said panels are corrugated in cross section.

9. In apparatus according to claim 8, the further improvement wherein said cover panels include gas-permeable apertures.

10. In apparatus according to claim 2, the further improvement
including filter means arranged for substantially encircling said catalyst plate when said device is in said first, closed position, said filter material being fluid impermeable to at least one of aerosol and steam, said filter material forming a seal against free passage of said gas mixture in said atmosphere when said cover panels are in said first, closed position.

11. In apparatus according to claim 5, the further improvement wherein said filter elements further comprise at least two layers of gas-permeable filter materials, at least one of said layers of filter materials being essentially impermeable to aerosols, and another of said layers being repelled by steam.

12. In apparatus according to claim 1, the further improvement wherein said protective device includes at least one holding device which releases at a predetermined temperature, said holding device being located on a side of said panels distal from said hinging means.

13. In apparatus according to claim 12, the further improvement wherein said holding device further comprises pretensioning means by which said cover panels are pivoted into said second position upon opening, said pretensioning means being positioned between each of said cover panels and said catalyst panel.

14. In apparatus according to claim 8, the further improvement wherein said corrugations of said cover panels are staggered with respect to one another by a space of half of said wave period.

15. In apparatus according to claim 2, the further improvement wherein said filter material is impregnated with an ion exchange resin.

* * * * *